Dec. 11, 1928.

A. SAMUELSON 1,694,867

GLASS WORKING MACHINE

Filed July 29, 1921

8 Sheets-Sheet 1

Inventor
Alexander Samuelson,

By Hood & Shley

Attorneys

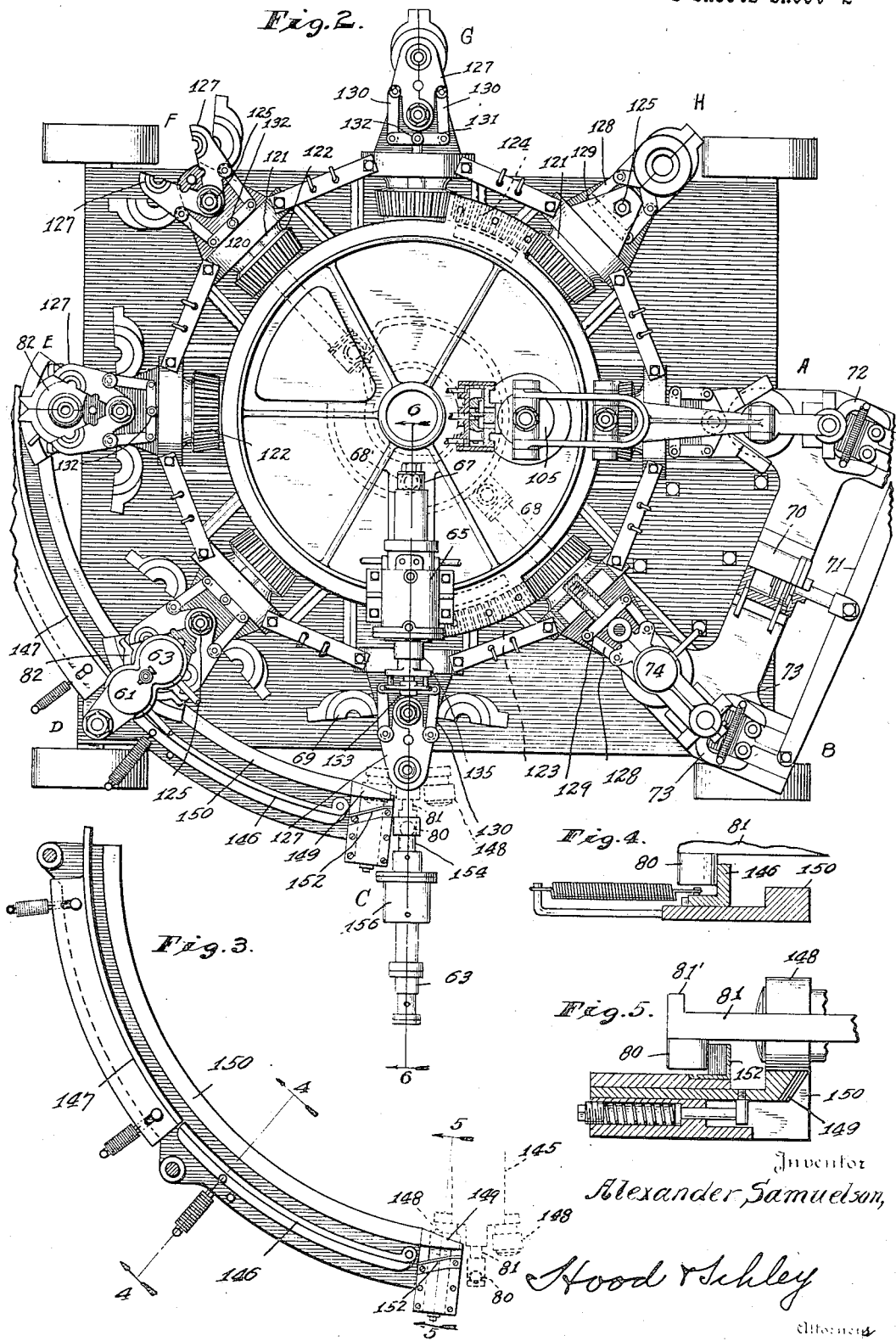

Dec. 11, 1928.

A. SAMUELSON 1,694,867

GLASS WORKING MACHINE

Filed July 29, 1921

8 Sheets-Sheet 3

Inventor
Alexander Samuelson,

By Hood & Sihley
Attorneys

Dec. 11, 1928.
A. SAMUELSON
GLASS WORKING MACHINE
Filed July 29, 1921
1,694,867
8 Sheets-Sheet 4
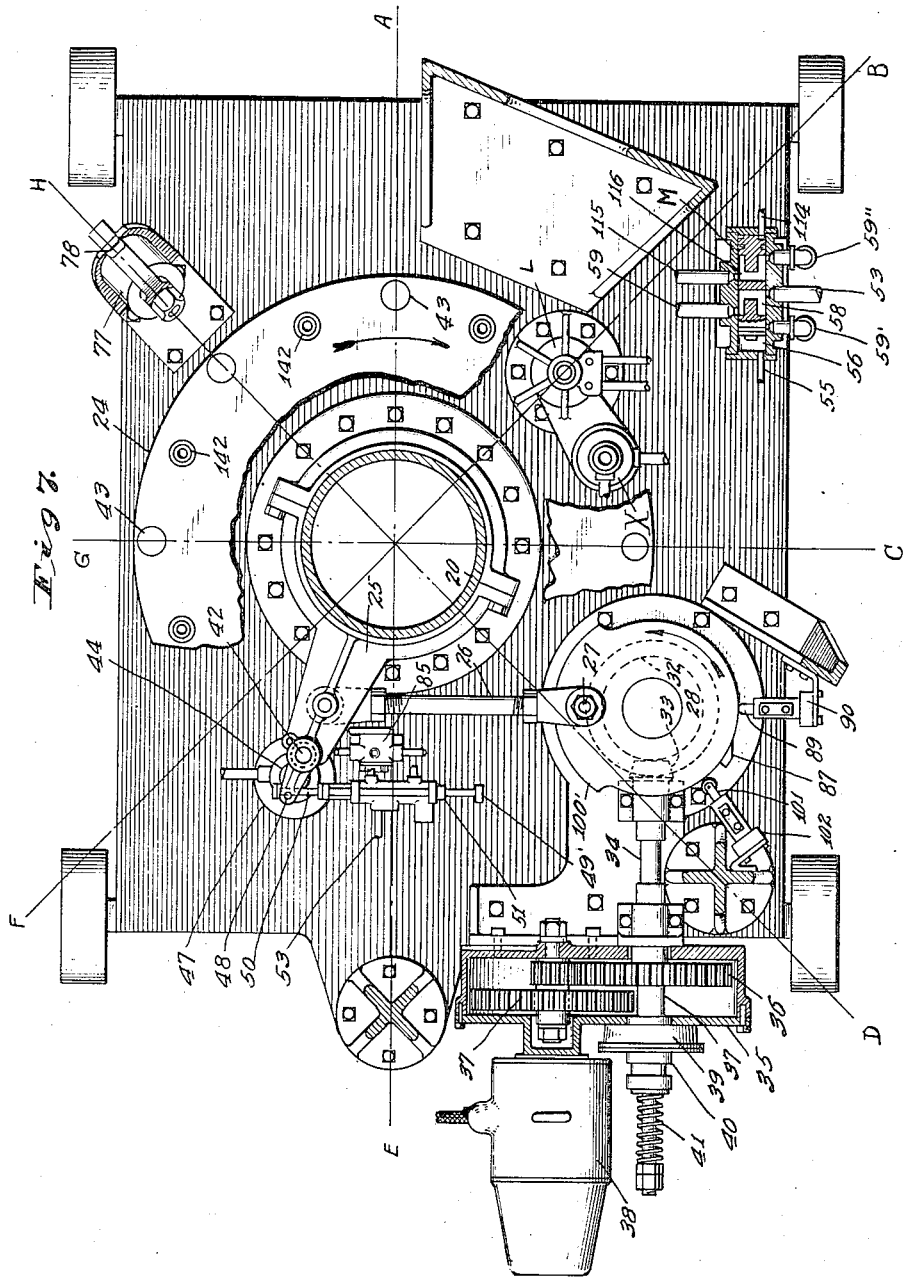
Inventor
Alexander Samuelson,
By Hood & Schley
Attorneys Dec. 11, 1928.
A. SAMUELSON
GLASS WORKING MACHINE
Filed July 29, 1921
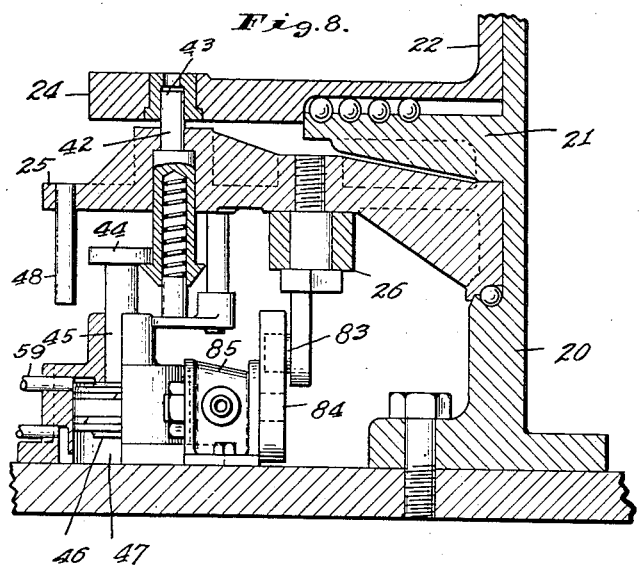
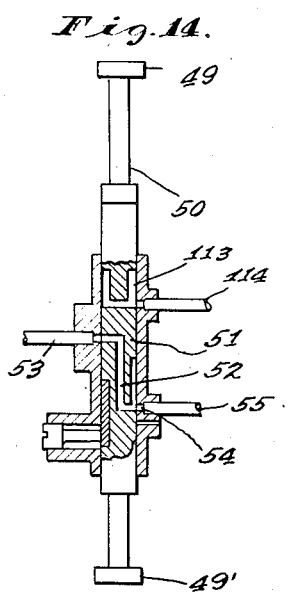
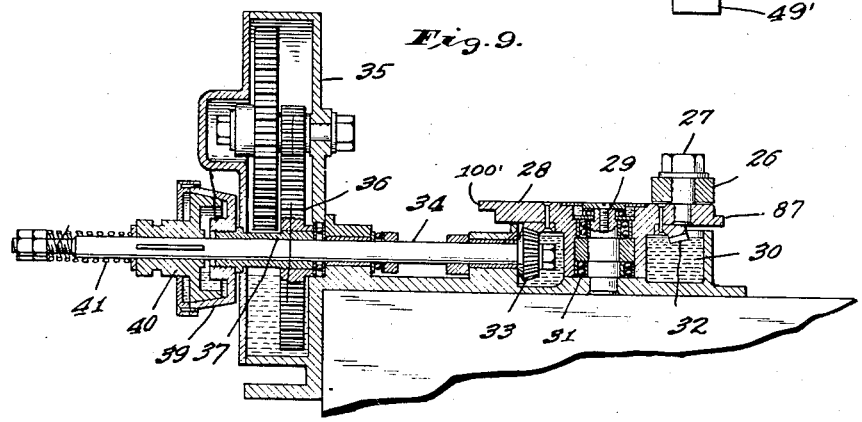
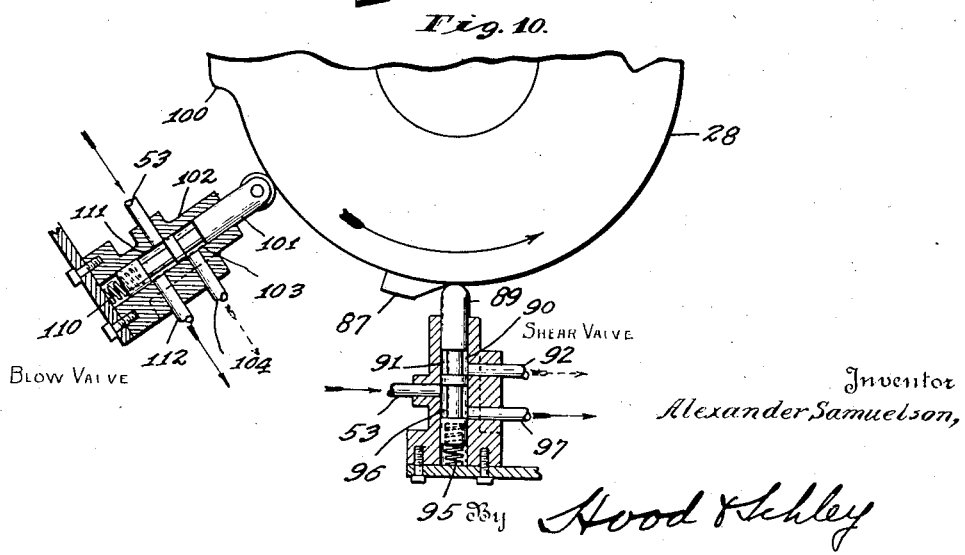
Inventor
Alexander Samuelson,
By Hood & Schley
Attorneys Dec. 11, 1928.
A. SAMUELSON
1,694,867
GLASS WORKING MACHINE
Filed July 29, 1921     8 Sheets-Sheet 6
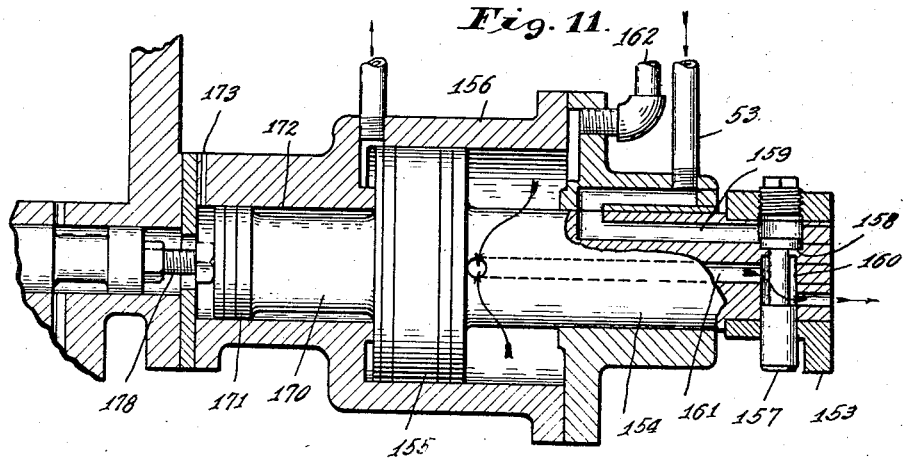
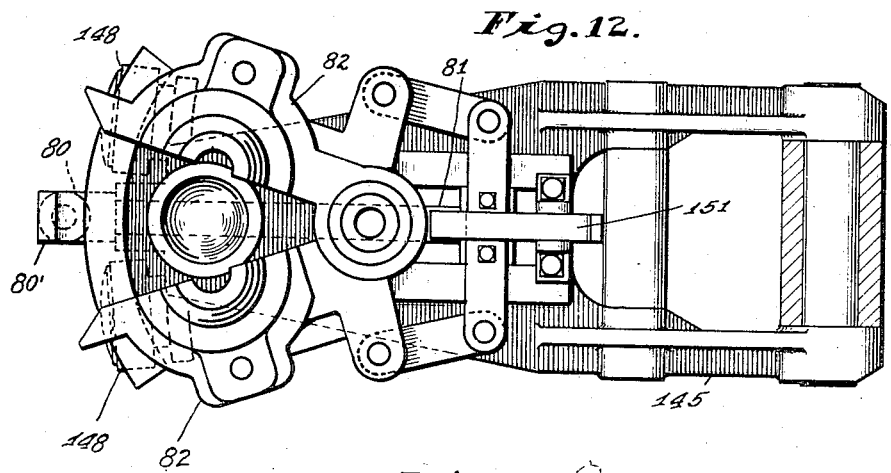
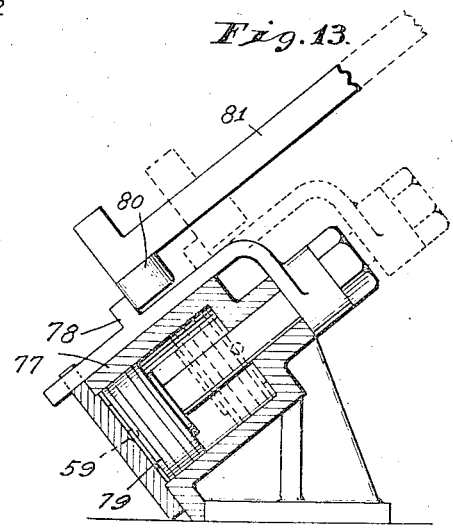
Inventor
Alexander Samuelson,
By Hood & Schley
Attorneys Dec. 11, 1928.  1,694,867

A. SAMUELSON

GLASS WORKING MACHINE

Filed July 29, 1921   8 Sheets-Sheet 7

Inventor
Alexander Samuelson,

By Hood & Schley
Attorneys

Dec. 11, 1928.

A. SAMUELSON 1,694,867

GLASS WORKING MACHINE

Filed July 29, 1921   8 Sheets-Sheet 8

Inventor
Alexander Samuelson,
By Hood Hihley
Attorneys

Patented Dec. 11, 1928.

1,694,867

UNITED STATES PATENT OFFICE.

ALEXANDER SAMUELSON, OF TERRE HAUTE, INDIANA, ASSIGNOR TO CHAPMAN J. ROOT, OF TERRE HAUTE, INDIANA.

GLASSWORKING MACHINE.

Application filed July 29, 1921. Serial No. 488,391.

The object of my invention is to produce an automatic machine for the production of hollow glass ware by the blowing process, the construction being such that the mold carrying table is under the control of a continuously moving motor which, operating to drive a main timing shaft, which serves to mechanically advance the mold carrying table step by step at regular intervals, also operates, through the timing shaft to control certain pneumatic motors by which parts of the apparatus are caused to move through portions of their cycles in synchronism with the mechanical and regular advancement of the mold carrying table.

A further object of my invention is to provide such improvements in details of construction as will be hereinafter pointed out, whereby the efficiency of the apparatus as a whole is increased.

My improvements have been applied commercially to that type of machine which is shown in Patent No. 1,350,375, issued August 24, 1920, upon the application of Edward Miller and, therefore, the accompanying drawings illustrate my invention as embodied in that type of machine.

Figure 1:
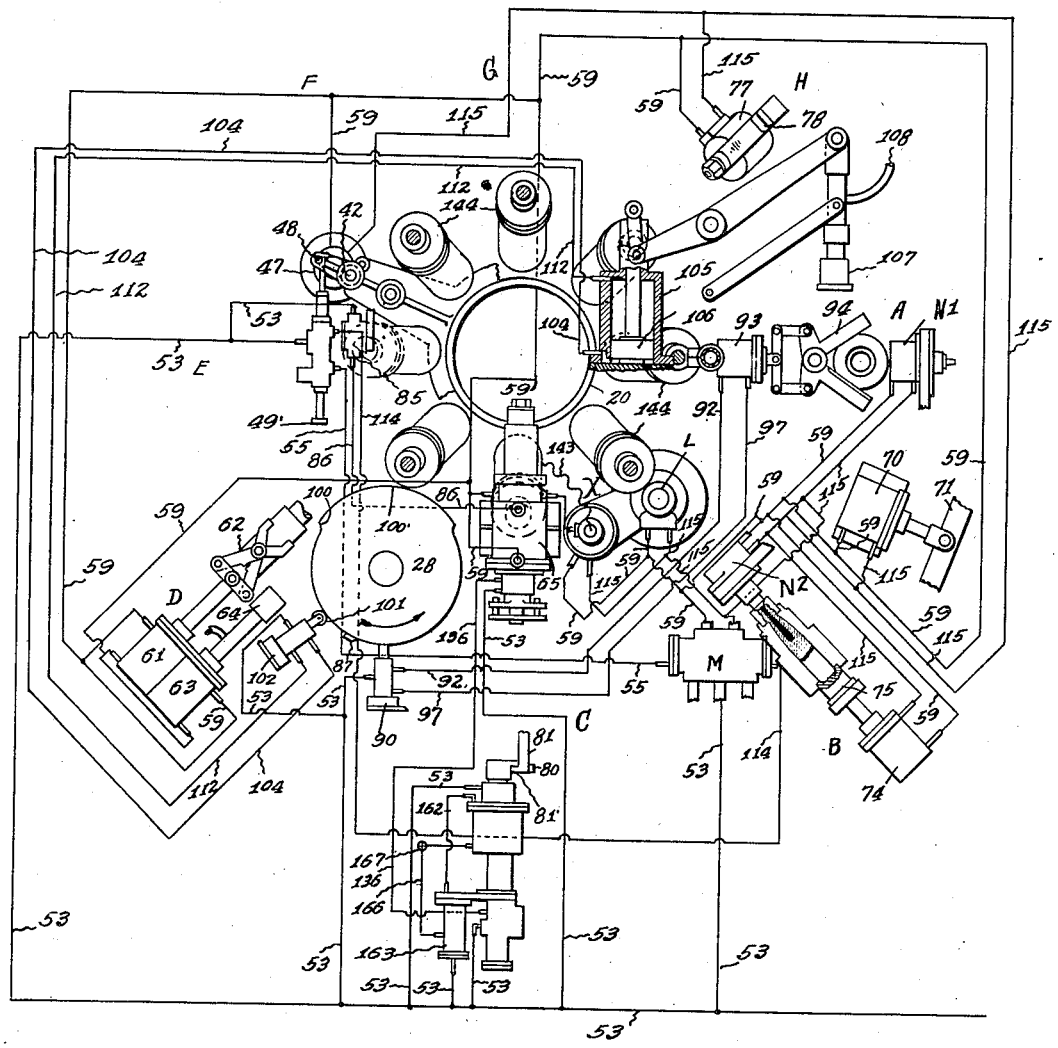
Figure 6:
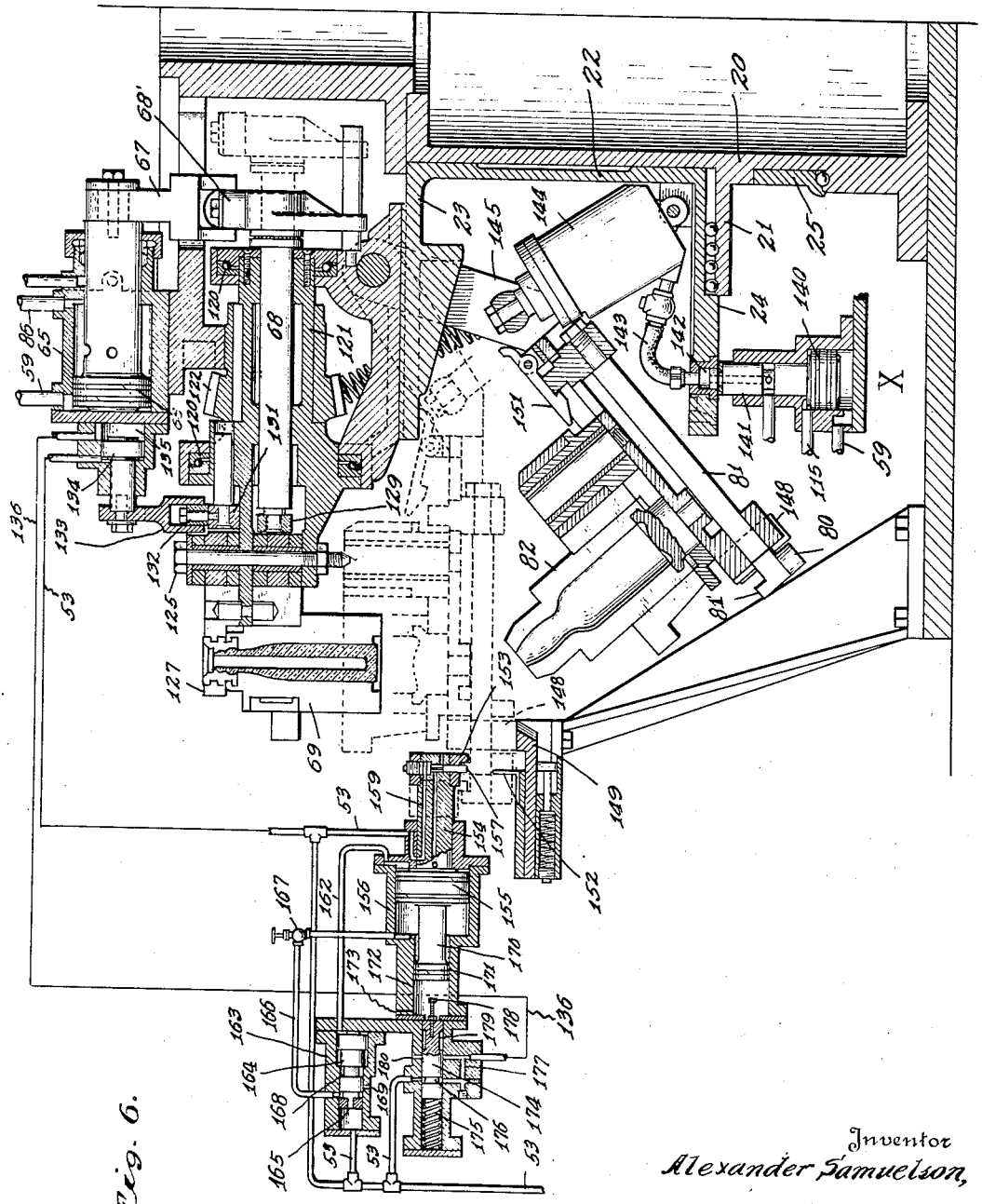
Figure 15:
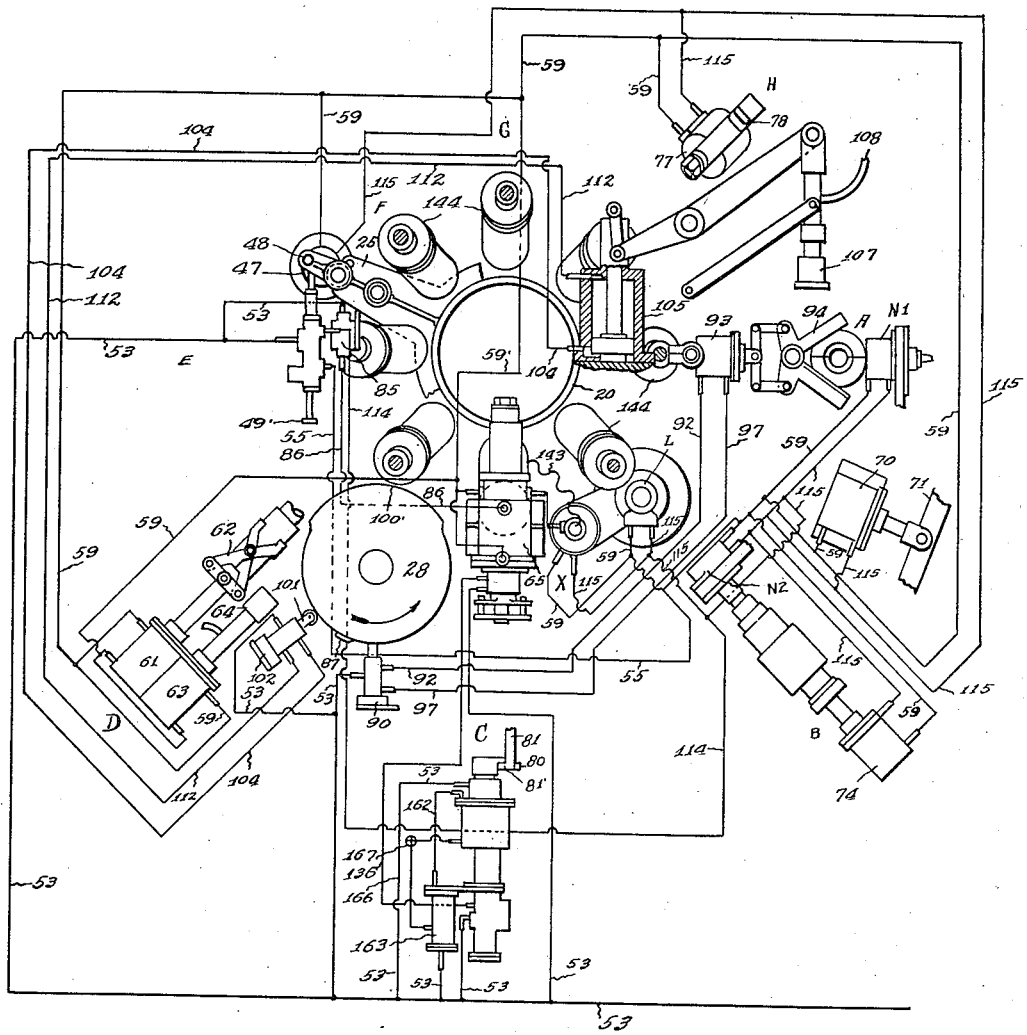
Figure 16:
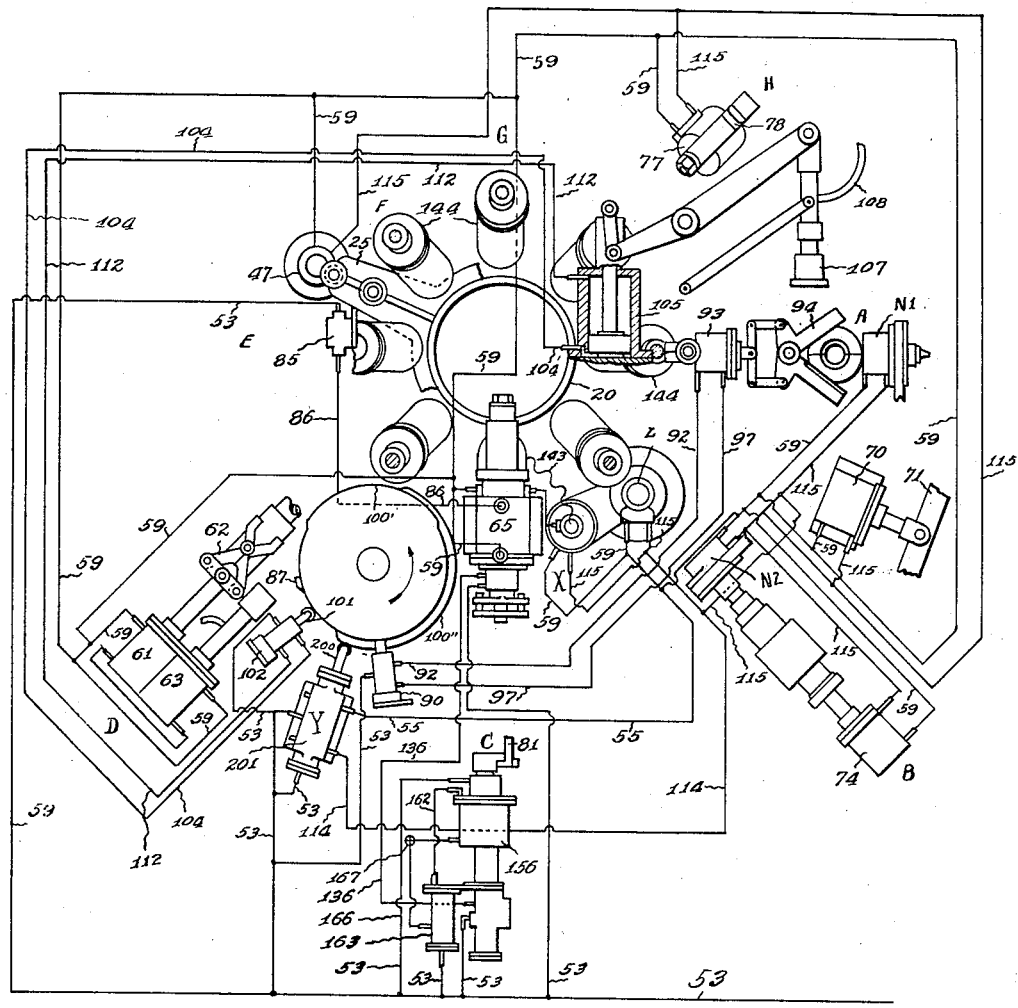
Figure 17:
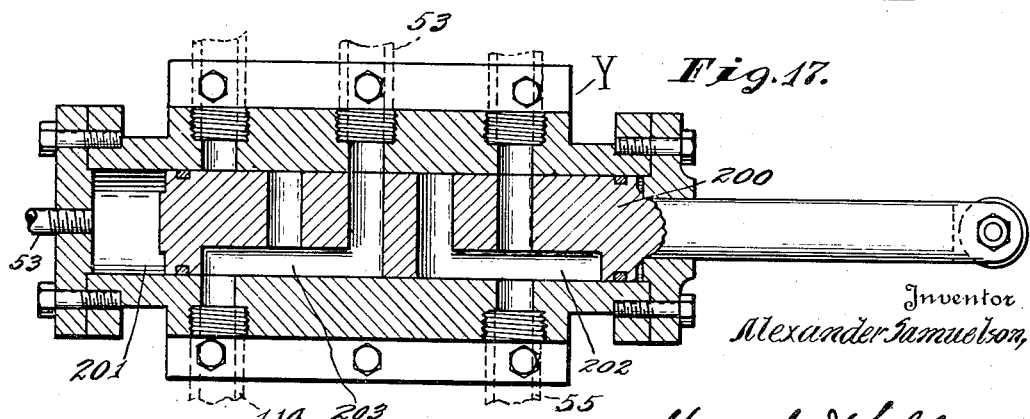

Fig. 1 is a diagram showing the various cooperative elements of the machine and the pneumatic piping by which the various parts are connected; Fig. 2 is a plan of the machine; Fig. 3, a detail of the cams for holding the blow molds; Fig. 4 a section on line 4—4 of Fig. 3; Fig. 5, a section on line 5—5 of Fig. 3; Fig. 6, a section, on a larger scale, on line 6—6 of Fig. 2; Fig. 7, a horizontal section below the mold carrying table; Fig. 8, a vertical section showing the table advancing arm and adjacent mechanism by which the driving pin is automatically withdrawn at the end of the stroke; Fig. 9, a vertical section through the timing shaft and adjacent driving gearing; Fig. 10, a fragmentary detail of the blow valve and shear valve, and an adjacent portion of the timer; Fig. 11, an enlarged vertical section of the means by which the blow mold sections are controlled; Fig. 12, a plan of the blow mold; Fig. 13, a section of the means for opening the blow mold sections; Fig. 14, a section of the slide valve and Fig. 15, a diagram showing modified piping eliminating the valve M; Fig. 16, a diagram showing a further modification of piping and valve arrangement by which a valve, controlled by the timer, controls the various pneumatic motors, which, in Fig. 1, are shown as controlled by valves M and 51, and Fig. 17, a detail of the valve Y.

In the drawings, 20 indicates a suitable supporting pedestal or column provided with a flange 21 which supports a time or turn table 22, providing upper and lower horizontal flanges 23 and 24 respectively. Journaled on the column 20 is a main driving arm 25 connected by a pitman 26 and a wrist pin 27, with a timer 28 having a pin 29 arranged in the center of an oil bath 30 so that the bearings 31 of the timer may be kept flooded with oil, and the gear 32, carried by the timer, may run in the oil bath. Gear 32 is driven by a pinion 33 carried by shaft 34 which is extended through a casing 35 which forms an oil bath for the drive gear 36 of a reducing train 37 connecting with the motor 38, said gear 36 being carried by a sleeve 37 journaled on shaft 34 and carrying a clutch cone 39 mating with a clutch cone 40 normally urged to operative position by spring 41, the cone 40 being shiftable out of operative position by an ordinary shifting lever (not shown).

The arm 25 carries a plunger 42 which is adapted to enter any one of the cups 43 in flange 24, there being as many of these cups as there are mold units on flange 23. When arm 25 nears the end of its forward movement, the lower head end of plunger 42 is brought beneath a head 44 of a stem 45 carried by a piston 46 in cylinder 47. Before arm 25 reaches the limit of its outward movement, the pin 48 carried by arm 25 is brought into engagement with the head 49 of the valve stem 50 of the slide valve 51 and shifts this slide valve so that its port 52 will form a connection between the main air supply line 53 and the passage 54 which connects by pipe 55 with one end of cylinder 56 of the main controlling valve M, thereby causing said valve to shift to the position shown in Fig. 7 so that the port 58 forms a connection between the main air supply line 53 and an air line 59, having several branches, all of which, for convenience, are designated by the same reference number. One of the branches of the pipe 59 leads to the top of the cylinder 47 so that piston 46 is driven downwardly to cause head 44 to pull plunger 42 away from engagement with the flange 24. At the same time, air flows through the various branches of pipe 59 to the lower end of the lock pin cylinder L and the lower end of cylinder X (Fig. 6) which supplies the blow mold raising cylinders. Air also flows to the lower end of the nipple cylinder N¹, located at station A, and the lower end of the nipple cylinder N², located at station B; also to the outer end of cylinder 61 which controls the mold clamping tongs 62, of ordinary construction located at station D; also to one end of cylinder 63 which causes blow head 64, (of ordinary construction) at station D to move down into engagement with the upper end of the blank at the blowing position; also into one end of cylinder 65 (Fig. 6) to cause piston 66 to move to the right (Fig. 6) so as to operate through yoke 67, through plunger 68, as fully described in the Miller patent referred to, to open the blank mold 69 at station C; also to one end of a cylinder 70 which controls a clamp operating bar 71 which causes a closing of clamping jaws 72 at station A upon the blank mold at that station and clamping jaw 73 at station B on the blank mold at that station; also to one end of a cylinder 74, the piston of which is thereby caused to move the baffle plate 75 (Fig. 1) into engagement with the top of the blank mold at station B; also to one end of cylinder 77 (Figs. 1 and 13) to cause shoulder 78, carried by piston 79, to engage roller 80 on rod 81 (Fig. 6) to open the blow mold 82 at station H.

Just before pin 48 comes into engagement with head 49 of slide valve 50, a pin 83, carried by arm 25 comes into engagement with the fork 84 of a valve 85, like valve 123 in the Miller patent, so as to form a connection through the valve 85 from one of the branches of the main line 53 (Fig. 1) to a line 86 which leads to one end of cylinder 65 (Fig. 6), so that piston 66 is driven (to the left, Fig. 6) so as to bring yoke 67 into position to receive roller 68' of rod 68 of the blank mold unit which is being brought to station C.

Soon after the beginning of the return stroke of arm 25, pin 83 reverses fork 84 and valve 85 so that line 86 is exhausted to atmosphere.

Soon after arm 25 starts on its return movement, a lug 87 on timer 28 comes into engagement with a stem 89 (Fig. 10) of a valve 90 so as to bring groove 91 in position to connect the main line 53 with line 92 which leads to one end of the shear closing cylinder 93 to close the shears 94 at station A. Lug 87 passes quickly beyond stem 89 so that spring 95 returns groove 96 to normal position where connection is established between the main air line 53 and line 97 which leads to the opposite end of cylinder 93 so as to open the shears 94. Immediately after lug 87 passes stem 89, a shoulder 100 on the timer 28 comes into engagement with the stem 101 of the valve 102 so as to shift groove 103 in position to establish communication between the main line 53 and line 104 which leads to the lower end of a cylinder 105 to cause piston 106 to move upward and swing the cover 107, at station A, down upon the open upper end of the inverted blank mold, the cover 107 and its mounting being the same as cover 280 in the Miller patent and operating, as in that structure, when brought into engagement with the upper end of the blank mold, to admit a compacting pressure of air, from the supply line 108 into the upper end of the blank mold so as to compact the glass down into the neck ring. Reference will be made later to the neck ring construction and operation.

The portion 100' on the timer 28, of which shoulder 100 forms one end, extends through about ninety degrees of the timer so that stem 101 is held in the previously described position for a certain length of time to hold cover 107 down on the blank mold at station A and as soon as this portion 100' passes beyond stem 101, the spring 110 returns stem 101 to the position shown in Fig. 10 so that groove 111 forms a connection between supply line 53 and the line 112 which leads to the upper end of cylinder 105, and thus operates to withdraw cover 107.

When arm 25 nears the initial end of its stroke its pin 48 comes into engagement with the head 49' (Fig. 7) on the slide valve 50 and shifts port 113 of valve 50 so as to establish connection between line 53 and passage 114, at the same time shifting port 52 and establishing communication between pipe 55 and atmosphere. The establishment of communication between main line 53 and passage 114 (Fig. 1) supplies air to the right hand end of the main valve M (Fig. 7), so as to bring port 58 in position to establish communication with pipe 59 and atmosphere through pipe 59', and so as to establish communication between main line 53 and pipe 115, said pipe, with its parts in position shown in Fig. 7, having previously been in communication with atmosphere through port 116 and pipe 59''.

When valve M is shifted to the left (Fig. 7) so that passage 116 connects main line 53 with pipe 115, said pipe through its various branches causes the following operations:

The lock pin L is withdrawn and the piston of cylinder X (Fig. 6, to be described later) is withdrawn; the nipples N¹ and N² are withdrawn; the clamping tongs 72 and 73 are released; the baffle plate 75 is withdrawn and the piston 46 is moved upwardly so that its head 44 will be in position to receive the head of driving pin 42 beneath it when the arm 25 is again brought to its forward position. The lug 78 of piston 77 is also brought to the position shown in full lines in Fig. 13.

As previously stated, the flange 23 of the mold table carries in the present machine, eight blank mold units which are identical. Mounted in bearings 120 so as to rotate about a horizontally and radially placed axis, is a spindle 121 carrying a bevel gear 122 which is brought successively, by the rotation of the mold table, into engagement with a rack 123, which will serve to revert the blank mold as it travels from station B to station C, and with a rack 124 which will serve to invert the blank mold as it travels from station G to station H.

This construction, as well as some other parts to which reference will be made briefly, is the same as that disclosed in the Miller patent and, therefore, needs no great detail of description here. The spindle 121 carries a pivot pin 125 upon which the two parts of the blank mold 69 (Figs. 2 and 6), and the two parts of the neck ring 127 are pivoted in the usual well known manner. The two parts of the blank mold 69 are connected by the usual links 128 (upper right hand corner of Fig. 2) with the cross bar 129 (Fig. 6). The neck ring members 127 are connected by the usual links 130 (Fig. 2) with a cross bar 131 which is provided at its middle with a roller 132 which, as it comes opposite station C, comes in between the fingers of the fork 133 carried by a piston 134 mounted in cylinder 135. This cylinder 135 has its opposite ends supplied by pipes 136 and 53, the pipe 53 leading into the cylinder on the stem side of the piston 134 and furnishing a constant supply of air which tends to move the piston 134 to the right from the position shown in Fig. 6, to open the neck ring sections. As is common in this type of construction, the blank mold sections envelope the neck ring sections, as clearly shown in Fig. 6, so that the neck ring sections are held closed by the blank mold sections. When the parts are at station C, however, and the blank mold sections have been opened, roller 132 lies in fork 133 and the neck ring sections are held closed by the preponderance of force in the right hand end of cylinder 135 (Fig. 6), due to the larger effective area of that end of the piston 134.

As in the Miller machine, cylinder X contains a piston 140, the position of which is controlled by the flow of air through branches of pipes 59 and 115, as already described. Piston 140 is provided with a stem 141 adapted to be projected upwardly into any one of a series of pockets 142, each of which leads by a flexible connection 143 to a blow mold lifting cylinder 144, the piston of which acts upon an arm 145 carrying the blow mold sections 82 and associated parts substantially as illustrated and described in detail in the Miller patent. As the details of this blow mold structure form no part of my present invention, I do not deem it necessary to enter further into the description thereof, except to say that the roller 80 is engaged by spring cams 146 and 147 so that the blow mold sections are held closed during the passage from station C through station D to station E, the outer end of arm 145 being provided with a pair of rollers 148 which, after having been moved up past and upon the spring slide 149, travels over said spring slide onto the arc shaped table 150 which extends from station C to station E.

At the time arm 145 is moved upwardly to the position shown in dotted lines in Fig. 6, the rod 81 is held in its upward position, and the blow molds thereby held open, by a catch 151 which is moved, by contact with flange 23 to the position shown in dotted lines in Fig. 6 so as to release the blow molds and permit them to be moved to closed position by the pneumatic mechanism which is now to be described.

In order to insure a closing of the blow molds, in case the air mechanism fails, I provide a cam 152 (Fig. 2) at the initial end of table 150 which will engage roller 80, and mechanically close the blow mold sections if the pneumatic mechanism should fail to operate.

Referring now to Fig. 6, it will be seen that, when the blow mold arm 145 is moved up to the position shown in dotted lines in Fig. 6, a finger 81' on rod 81, is brought up in front of the finger 153 on a piston stem 154 and piston 155 in cylinder 156, and at the same time this finger 81' comes into engagement with, and moves upwardly, a valve 157.

Normally, valve 157 seats at 158 so as to close passage 159 which is connected to the main supply line 53 and at the same time, through groove 160, gives access to atmosphere through a passage 161 in stem 154 from the right hand end of cylinder 156 and the pipe 162 which connects said end with the right hand end of the cylinder 163.

Cylinder 163 has two differential bores, and in a correspondingly formed piston 164, which is normally held in the position shown in full lines in Fig. 6, by pressure acting upon the small end of the piston from the main supply 53, this pressure passing through a passage 165 which is normally in registry in a pipe 166 having its choker valve 167 and leading into the left hand end of cylinder 156, said piston carrying a groove 168 which serves to at times establish communication between pipe 166 and atmosphere through port 169, the arrangement being such that when valve 157 is raised, so as to close the outer end of passage 161 and open communication between passages 159 and 161, the flow of air from pipe 53 into the right hand end of cylinder 156 will drive piston 155 to the position shown in Fig. 11 and, passing through pipe 162, will drive piston 164 to the left (Fig. 6). The movement of piston 155 to the left (Fig. 6) causes a closing of the blow mold sections 82, but just before these blow mold sections are completely closed together, I have found it to be very desirable that the neck ring sections release their hold upon the blank so that the blank, with its hardened mouth, may settle by gravity into the blow mold when said blow mold is completely closed.

In order to accomplish this result, piston 155 carries a stem 170 provided at its outer end with a piston 171 which fits a bore 172 in cylinder 156 considerably smaller than the main body of the cylinder, said bore being vented at its outer end at 173.

Except when the mold unit is immediately opposite station C, a valve 174, which is normally held in position shown in Fig. 6 by spring 175, affords communication through groove 176 and passage 177, from the main line 53 to pipe 136 so that there is normally equal pressure in both ends of cylinder 135 but effectively unbalanced on piston 134 due to the stem thereof, so that fork 133 is normally held shown in the position in Fig. 6. When piston 155 has nearly reached the end of its mold closing stroke, piston 171 comes into engagement with an adjustable pin 178 carried by valve 174, shifting said valve to throw groove 176 out of registry with pipe 53 and block said pipe, and at the same time bring groove 179 in position to establish communication between pipe 136 and atmosphere through port 180 so that, until finger 81' is withdrawn from beneath valve 157 by an advancing movement of the mold table, the normally dominating pressure in the right hand end of cylinder 135 will be exhausted to atmosphere, and piston 134 will move to the right (Fig. 6) so as to open the neck ring just before the blow molds are closed around the blank, thus permitting the blank to settle in the blow mold without the possibility of distortion due to any lack of alinement between the blow mold section and the neck ring. I have found that by this arrangement considerable breakage just below the hardened neck and mouth of the bottle, due to lack of alinement between the blow mold and neck ring, is avoided. Variation in the type of the finished product is also avoided because any lack of axial co-ordination between the neck ring and blow mold is eliminated owing to the fact that the finished neck sinks to definite position at the top of the blow mold.

As soon as the mold table starts to move forward, finger 81' is withdrawn from beneath valve 157 so that said valve seats upon seat 158, thereby establishing communication between the right hand end of cylinder 156 and atmosphere through passage 161, and also from the right hand end of cylinder 163 through pipe 162, whereupon valve 164 moves to the right (Fig. 6) and pressure is furnished from the main line through pipe 166 to the left hand end of cylinder 156 so as to move finger 153 out to position to properly cooperate with the finger 81' of the next oncoming blow mold unit. The table locking pin L is a piston controlled pin like that shown in Fig. 10 of the Miller patent and needs no further description, this locking pin co-ordinating with the pockets 43 successively as they are brought into position.

From what has been said it will be readily understood that the valve M may be eliminated and the various portions which, in Fig. 1, are illustrated as being under the control of this valve M, be placed directly under the control of the slide valve by making the ports in the slide valve of sufficient size and by connecting pipe 55 with pipe 59 and pipe 114 with pipe 115. In Fig. 15, therefore, I have shown a diagram of such an arrangement indicating one pipe line as 55—59 and the other pipe line as 114—115.

In Fig. 16 I have shown an arrangement by which both the valves 51 and M (Fig. 1) and the valve 51 in Fig. 15, are replaced by the valve Y which is provided with a plunger 200 held into engagement with the timer by air pressure in chamber 201 and shifted intermittently by a portion 100'' on the timer 28. Valve Y receives air through pipe 53 and delivers this air alternately through passages 202 and 203 to pipes 55 and 114 respectively which pipes are the same and lead to the same pneumatic motors as in the arrangement shown in Figs. 1 and 15.

I claim as my invention:

1. In a glass working machine, the combination of a separable blank mold, a separable neck ring, a separable blow mold, a blow mold carrier, means for opening and closing the blank mold, means for moving the blow mold carrier to and from position to coordinate the blow mold with the neck ring, means controlled by the blow mold carrier as the blow mold nears coordinated relationship with the neck ring for opening the neck ring.

2. In a glass working machine, the combination of a manipulator for a blank mold, a manipulator for a neck ring, a manipulator for a blow mold, a blow mold carrier, means for moving said blow mold carrier to shift a blow mold into and out of blowing position, means controlled by the movement of the blow mold carrier for controlling the application of motive power to the blow mold manipulator, means controlled by the movement of the blow mold manipulator for controlling the application of motive power to the neck ring manipulator and means for controlling application of motive power to the blank mold manipulator.

3. In a glass working machine, the combination of a manipulator for a blank mold, a manipulator for a neck ring, a manipulator for a blow mold, a blow mold carrier, means for moving said blow mold carrier to shift a blow mold into and out of blowing position, means controlled by the movement of the blow mold carrier for controlling the application of motive power to the blow mold manipulator, means controlled by the movement of the blow mold manipulator for controlling the application of motive power to the neck ring manipulator whereby the neck ring may be withdrawn from the blank supported thereby subsequent to the presentation of a blow mold in blowing position but not completely closed, and means for controlling application of motive power to the blank mold manipulator.

4. In a glass working machine the combination of a pneumatic cylinder and piston and blank mold manipulator carried by said piston, a second pneumatic cylinder and piston, the effective area of the second piston being greater in ring closing direction, and a neck ring manipulator carried by said second piston, a third cylinder and piston, said third piston carrying a blow mold manipulator, a blow mold carrier, means for moving said carrier to shift a blow mold into and out of blowing position, means operated by the movement of a blow mold carrier to control application of motive fluid to the third piston in blow mold closing direction, a pneumatic valve arranged in the path of movement of the third piston and controlling flow of motive fluid to the second cylinder, a second pneumatic valve, and connections between said second valve and the third cylinder whereby flow of motive power to and from the third cylinder in mold closing direction controls flow of motive power from and to the opposite side of the third piston.

5. In a glass working machine the combination of a pneumatic cylinder and piston and blank mold manipulator carried by said piston, a second pneumatic cylinder and piston and a neck ring manipulator carried by said second piston, a third cylinder and piston, said third piston carrying a blow mold manipulator, a blow mold carrier, means for moving said carrier to shift a blow mold into and out of blowing position, means operated by the movement of a blow mold carrier to control application of motive fluid to the third piston in blow mold closing direction, a pneumatic valve arranged in the path of movement of the third piston and controlling flow of motive fluid to the second cylinder, a second pneumatic valve, and connections between said second valve and the third cylinder whereby flow of motive power to and from the third cylinder in mold closing direction controls flow of motive power from and to the opposite side of the third piston.

6. In a glass working machine the combination of a pneumatic cylinder and piston and blank mold manipulator carried by said piston, a second pneumatic cylinder and piston, the effective area of the second piston being greater in ring closing direction, and a neck ring manipulator carried by said second piston, a third cylinder and piston, said third piston carrying a blow mold manipulator, a blow mold carrier, means for moving said carrier to shift a blow mold into and out of blowing position, means operated by the movement of a blow mold carrier to control application of motive fluid to the third piston in blow mold closing direction, and a pneumatic valve arranged in the path of movement of the third piston and controlling flow of motive fluid to the second cylinder.

7. In a glass working machine the combination of a pneumatic cylinder and piston and blank mold manipulator carried by said piston, a second pneumatic cylinder and piston and a neck ring manipulator carried by said second piston, a third cylinder and piston, said third piston carrying a blow mold manipulator, a blow mold carrier, means for moving said carrier to shift a blow mold into and out of blowing position, means operated by the movement of the blow mold carrier to control application of motive fluid to the third piston in blow mold closing direction, and pneumatic valve arranged in the path of movement of the third piston and controlling flow of motive fluid to the second cylinder.

8. In a glass working machine, the combination of a blow-mold carrier, a pneumatic blow-mold manipulator, said manipulator comprising a cylinder, a piston and piston rod projected from the cylinder and provided with an air supply passage forming a communication between one end of the cylinder and an air supply, and a valve controlling said passage and arranged in the path of movement of the blow-mold carrier.

9. In a glass working machine, the combination of a mold table and a driving train therefor comprising a rotary element 28 having a gear 32 on its under face, an oil pan 30 within which the element 28 is journaled so that its bearing and gear may be submerged in oil retained in said pan, a drive shaft journaled in the side of said pan and projected into said pan, and a gear carried by said projected shaft end and meshing with gear 32.

In witness whereof, I ALEXANDER SAMUELSON have hereunto set my hand at Terre Haute, Indiana.

ALEXANDER SAMUELSON.